(12) United States Patent
Hill

(10) Patent No.: US 10,496,646 B2
(45) Date of Patent: Dec. 3, 2019

(54) ESTIMATING DISTINCT VALUES FOR DATABASE SYSTEMS

(71) Applicant: SAP SE, Walldorf (DE)

(72) Inventor: Gerhard Hill, St. Leon (DE)

(73) Assignee: SAP SE, Walldorf (DE)

( * ) Notice: Subject to any disclaimer, the term of this patent is extended or adjusted under 35 U.S.C. 154(b) by 394 days.

(21) Appl. No.: 15/349,849

(22) Filed: Nov. 11, 2016

(65) Prior Publication Data
US 2018/0137171 A1 May 17, 2018

(51) Int. Cl.
*G06F 16/2453* (2019.01)

(52) U.S. Cl.
CPC .............. *G06F 16/24545* (2019.01)

(58) Field of Classification Search
CPC ......... G06F 17/30469; G06F 16/24544; G06F 16/24545
See application file for complete search history.

(56) References Cited

U.S. PATENT DOCUMENTS

| | | | | |
|---|---|---|---|---|
| 5,999,928 | A * | 12/1999 | Yan .................... | G06F 16/2462 707/691 |
| 8,086,598 | B1 * | 12/2011 | Lamb ................. | G06F 17/30466 707/606 |
| 2003/0084025 | A1 * | 5/2003 | Zuzarte ............ | G06F 17/30469 707/2 |
| 2004/0225639 | A1 * | 11/2004 | Jakobsson ........... | G06F 16/2462 |
| 2005/0160102 | A1 * | 7/2005 | Abdo ................ | G06F 17/30498 707/100 |
| 2007/0027860 | A1 * | 2/2007 | Bestgen ............ | G06F 17/30433 707/5 |
| 2010/0030728 | A1 * | 2/2010 | Chakkappen ..... | G06F 17/30469 707/713 |
| 2014/0149388 | A1 * | 5/2014 | Gruszecki ......... | G06F 17/30469 707/714 |

OTHER PUBLICATIONS

Wikipedia, Join (SQL), https://web.archive.org/web/20120502141210/https://en.wikipedia.org/wiki/Join_(SQL), 2012, 19 pp. (Year: 2012).*

* cited by examiner

*Primary Examiner* — Marc S Somers
(74) *Attorney, Agent, or Firm* — Fountainhead Law Group P.C.

(57) ABSTRACT

Some embodiments provide a non-transitory machine-readable medium stores a program. The program receives a query for data that includes a join operation. The program further generates a plurality of candidate query execution plans based on the query, each candidate query execution plan comprising a set of reduction operations. The program also determines a plurality of execution costs associated with the plurality of sets of reduction operations in the plurality of candidate query execution plans. The program further selects a query execution plan from the plurality of candidate query execution plans based on the plurality of execution costs. The program also executes the query execution plan to generate a set of query results for the query.

20 Claims, 13 Drawing Sheets

| Table A | | |
|---|---|---|
| Row | a | x |
| 1 | 10 | 1 |
| 2 | 10 | 2 |
| 3 | 10 | 1 |
| 4 | 20 | 3 |
| 5 | 30 | 2 |
| 6 | 50 | 5 |
| 7 | 50 | 8 |
| 8 | 80 | 9 |
| 9 | 90 | 8 |

200

| Table B | | |
|---|---|---|
| Row | x | y |
| 1 | 2 | 2 |
| 2 | 3 | 1 |
| 3 | 2 | 5 |
| 4 | 4 | 5 |
| 5 | 5 | 2 |
| 6 | 6 | 7 |
| 7 | 6 | 9 |
| 8 | 7 | 8 |
| 9 | 9 | 9 |

210

| Table C | | |
|---|---|---|
| Row | y | c |
| 1 | 7 | 15 |
| 2 | 8 | 15 |
| 3 | 9 | 25 |
| 4 | 6 | 25 |
| 5 | 5 | 35 |
| 6 | 5 | 75 |
| 7 | 4 | 65 |
| 8 | 1 | 55 |
| 9 | 1 | 45 |

Table A (200)

| Row | a | x |
|---|---|---|
| 1 | 10 | 1 |
| 2 | 10 | 2 |
| 3 | 10 | 1 |
| 4 | 20 | 3 |
| 5 | 30 | 2 |
| 6 | 50 | 5 |
| 7 | 50 | 8 |
| 8 | 80 | 9 |
| 9 | 90 | 8 |

Table B (210)

| Row | x | y |
|---|---|---|
| 1 | 2 | 2 |
| 2 | 3 | 1 |
| 3 | 2 | 5 |
| 5 | 5 | 2 |
| 9 | 9 | 9 |

Table C (220)

| Row | y | c |
|---|---|---|
| 1 | 7 | 15 |
| 2 | 8 | 15 |
| 3 | 9 | 25 |
| 4 | 6 | 25 |
| 5 | 5 | 35 |
| 6 | 5 | 75 |
| 7 | 4 | 65 |
| 8 | 1 | 55 |
| 9 | 1 | 45 |

FIG. 2B

| Table A | | |
|---|---|---|
| Row | a | x |
| 1 | 10 | 1 |
| 2 | 10 | 2 |
| 3 | 10 | 1 |
| 4 | 20 | 3 |
| 5 | 30 | 2 |
| 6 | 50 | 5 |
| 7 | 50 | 8 |
| 8 | 80 | 9 |
| 9 | 90 | 8 |

200

| Table B | | |
|---|---|---|
| Row | x | y |
| 1 | 2 | 2 |
| 2 | 3 | 1 |
| 3 | 2 | 5 |
| 5 | 5 | 2 |
| 9 | 9 | 9 |

210

| Table C | | |
|---|---|---|
| Row | y | c |
| 3 | 9 | 25 |
| 5 | 5 | 35 |
| 6 | 5 | 75 |
| 8 | 1 | 55 |
| 9 | 1 | 45 |

Table A (200):

| Row | a | x |
|-----|----|---|
| 1 | 10 | 1 |
| 2 | 10 | 2 |
| 3 | 10 | 1 |
| 4 | 20 | 3 |
| 5 | 30 | 2 |
| 6 | 50 | 5 |
| 7 | 50 | 8 |
| 8 | 80 | 9 |
| 9 | 90 | 8 |

Table B (210):

| Row | x | y |
|-----|---|---|
| 2 | 3 | 1 |
| 3 | 2 | 5 |
| 9 | 9 | 9 |

Table C (220):

| Row | y | c |
|-----|---|----|
| 3 | 9 | 25 |
| 5 | 5 | 35 |
| 6 | 5 | 75 |
| 8 | 1 | 55 |
| 9 | 1 | 45 |

ESTIMATING DISTINCT VALUES FOR DATABASE SYSTEMS

BACKGROUND

Database management systems (DBMSs) are generally used to allow users and applications to interact with data stored in databases. For example, DBMSs allow databases to be defined and data in such databases to be created, queried, updated, removed, etc. Different DBMSs can process commands differently. In some cases, when a DBMS receives a query for a database, the DBMS may generate one or more query execution plans that specifies operations for accessing data in the database. The DBMS then selects an optimum query execution plan and executes it in order to generate the results of the query. The DBMS then returns the results of the query to the requestor.

SUMMARY

In some embodiments, a non-transitory machine-readable medium stores a program. The program receives a query for data that includes a join operation. The program further generates a plurality of candidate query execution plans based on the query, each candidate query execution plan comprising a set of reduction operations. The program also determines a plurality of execution costs associated with the plurality of sets of reduction operations in the plurality of candidate query execution plans. The program further selects a query execution plan from the plurality of candidate query execution plans based on the plurality of execution costs. The program also executes the query execution plan to generate a set of query results for the query.

In some embodiments, the set of reduction operations in a particular candidate query execution plan of the plurality of candidate query execution plans includes a reducing a first table to a second table based on a common attribute of the first and second tables used in the join operation. The execution cost associated with the particular candidate query execution plan may be based on a number of distinct values in the attribute of the first table. The program may further send the set of query results to a requestor from which the query is received.

In some embodiments, determining the execution cost associated with the particular candidate query execution plan includes determining a total number of rows in the first table. Determining the execution cost associated with the particular candidate query execution plan may further include selecting a subset of the total number of rows in the first table. Determining the execution cost associated with the particular candidate query execution plan may also include determining a number of distinct values in the common attribute of the subset of the total number of rows in the first table. Determining the execution cost associated with the particular candidate query execution plan may further include determining a number of distinct values in the first table based on the number of distinct values in the common attribute of the subset of the total number of rows in the first table.

In some embodiments, a method receives a query for data that includes a join operation. The method further generates a plurality of candidate query execution plans based on the query, each candidate query execution plan comprising a set of reduction operations. The method also determines a plurality of execution costs associated with the plurality of sets of reduction operations in the plurality of candidate query execution plans. The method further selects a query execution plan from the plurality of candidate query execution plans based on the plurality of execution costs. The method also executes the query execution plan to generate a set of query results for the query.

In some embodiments, the set of reduction operations in a particular candidate query execution plan of the plurality of candidate query execution plans includes a reducing a first table to a second table based on a common attribute of the first and second tables used in the join operation. The execution cost associated with the particular candidate query execution plan may be based on a number of distinct values in the attribute of the first table. The method may further send the set of query results to a requestor from which the query is received.

In some embodiments, determining the execution cost associated with the particular candidate query execution plan includes determining a total number of rows in the first table. Determining the execution cost associated with the particular candidate query execution plan may further include selecting a subset of the total number of rows in the first table. Determining the execution cost associated with the particular candidate query execution plan may also include determining a number of distinct values in the common attribute of the subset of the total number of rows in the first table. Determining the execution cost associated with the particular candidate query execution plan may further include determining a number of distinct values in the first table based on the number of distinct values in the common attribute of the subset of the total number of rows in the first table.

In some embodiments, a system includes a set of processing units and a non-transitory computer-readable medium storing instructions. The instructions cause at least one processing unit to receive a query for data that includes a join operation. The instructions further cause the at least one processing unit to generate a plurality of candidate query execution plans based on the query, each candidate query execution plan comprising a set of reduction operations. The instructions also cause the at least one processing unit to determine a plurality of execution costs associated with the plurality of sets of reduction operations in the plurality of candidate query execution plans. The instructions further cause the at least one processing unit to select a query execution plan from the plurality of candidate query execution plans based on the plurality of execution costs. The instructions also cause the at least one processing unit to execute the query execution plan to generate a set of query results for the query.

In some embodiments, the set of reduction operations in a particular candidate query execution plan of the plurality of candidate query execution plans includes a reducing a first table to a second table based on a common attribute of the first and second tables used in the join operation. The execution cost associated with the particular candidate query execution plan may be based on a number of distinct values in the attribute of the first table.

In some embodiments, determining the execution cost associated with the particular candidate query execution plan includes determining a total number of rows in the first table. Determining the execution cost associated with the particular candidate query execution plan may further include selecting a subset of the total number of rows in the first table. Determining the execution cost associated with the particular candidate query execution plan may also include determining a number of distinct values in the common attribute of the subset of the total number of rows in the first table. Determining the execution cost associated with the particular candidate query execution plan may further include determining a number of distinct values in the first table based on the number of distinct values in the common attribute of the subset of the total number of rows in the first table.

The following detailed description and accompanying drawings provide a better understanding of the nature and advantages of the present invention.

BRIEF DESCRIPTION OF THE DRAWINGS

FIGS. 2A-2E illustrate several tables through stages of a reduction phase of a join operation according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for estimating string intersections for a DBMS. In some embodiments, the DBMS is configured to process different queries for data in one or more databases managed by the DBMS. In some instances, the DBMS may receive a query that specifies an intersection of two or more sets of strings. In some such instances, the DBMS may generate one or more candidate query execution plans for executing the query. The DBMS then utilizes a technique for estimating the number strings in each set of the two or more sets of strings that is included in the intersection of the two or more sets of strings. Such a technique is used to calculate execution costs of the query execution plans. Based on the calculated execution costs of the candidate query execution plans, the DMBS selects a query execution plan and executes it in order to generate a query result, which the DBMS sends to the query requestor.

Described herein are also techniques for estimating the number of distinct values in an attribute (e.g., a column) of a table for a DBMS. In some instances, the DBMS can receive a query that specifies a join between two or more tables. In some such instances, the DBMS may also generate one or more candidate query execution plans for executing the query. The DBMS may employ a technique to estimate the number of distinct values in a column of a table. This technique is used to calculate execution costs of the query execution plans. Based on the calculated execution costs of the candidate query execution plans, the DMBS selects a query execution plan. The DBMS executes the selected query execution plan in order to generate a query result and then sends the query results to the query requestor.

Figure 1:
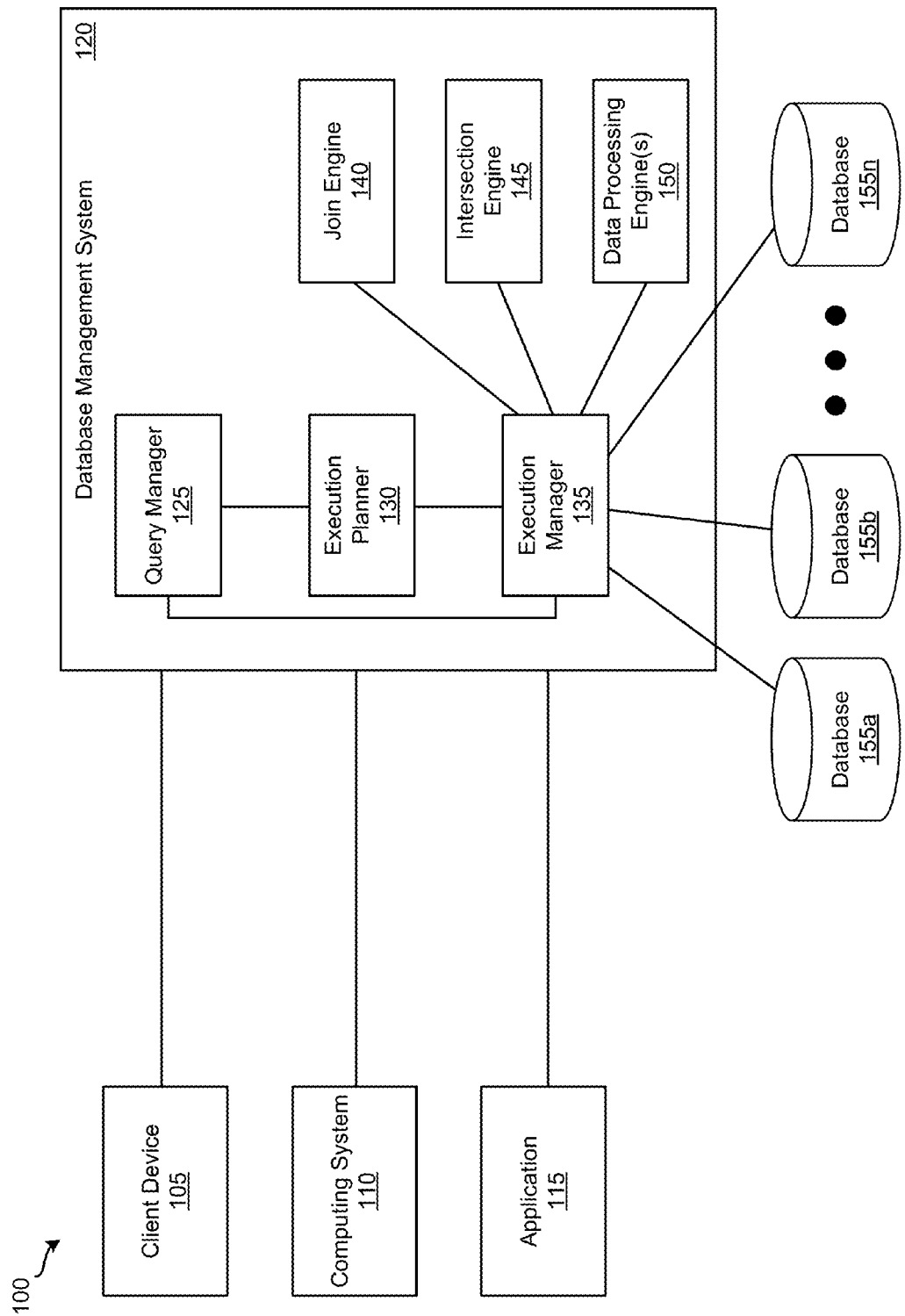
FIG. 1 illustrates a system that includes a database management system according to some embodiments.

FIG. 1 illustrates a system 100 that includes a database management system according to some embodiments. As shown, system 100 includes client device 105, computing system 110, application 115, database management system (DBMS) 120, and databases 155*a-n*. Client device 105, computing system 110, and application 115 are configured to communicate (e.g., via a network) and interact with DBMS 120. For example, client device 105, computing system 110, and application 115 may send DBMS 120 queries for information based on data in one or more databases 155*a-n*. In response to such queries, client device 105, computing system 110, and application 115 may receive query results.

Client device 105 may any electronic device (e.g., a cellphone, a smartphone, a wearable device, a tablet, a personal digital assistant (PDA), a media player, etc.) configured to communicate and interact with DBMS 120. In some embodiments client device 105 includes a client application (e.g., a web browser, a standalone application, a mobile application, etc.) that operates on client device 105 and is used to communicate with DBMS 120. Computing system 110 may any computing system (e.g., a desktop computer, a laptop, a server computer, etc.) configured to communicate and interact with DBMS 120.

Computing system 110 may include an application (e.g., a web browser, a client application, a standalone application, etc.) that operates on computing system 110 and is used to communicate with DBMS 120. In some embodiments, computing system 110 and DBMS 120 may be implemented on a single system (e.g., a cloud computing system) while, in other embodiments, computing system 110 and DBMS 120 may be implemented on separate systems.

Application 115 can be any software application that is configured to communicate and interact with DBMS 120. In some embodiments, application 115 is an application that operates on client device 105 and/or computing system 110. In other embodiments, application 115 operates on a system (e.g., a cloud computing system) in which DBMS 120 is implemented.

DBMS 120 is responsible for managing data stored in databases 155*a-n*. In some embodiments, DBMS 120 may be a column-oriented DBMS that stores data tables in databases 155*a-n* as columns of data. In other embodiments, DBMS 120 may be a row-oriented DBMS that stores data tables in databases 155*a-n* as rows of data. In yet other embodiments, DBMS 120 may be a hybrid column-oriented and row-oriented DBMS that can store data tables in databases 155*a-n* as columns of data and/or rows of data.

As shown in FIG. 1, DBMS 120 includes query manage 125, execution planner 130, execution manager 135, join engine 140, intersection engine 145, and data processing engine(s) 150. Query manage 125 is configured to manage queries that DBMS 120 receives from client device 105, computing system 110, and application 110. Upon receiving a query, query manager 125 parses the query and translates the query into a tree (e.g., a parse tree) of operators and operands. Query manager 125 then sends the tree to query execution planner 130. Query manager 125 can receive query results for the query from query execution manager 135. Once query manager 125 receives the query results, query manager 125 sends them to the requestor (e.g., client device 105, computing system 110, or application 115).

Execution planner 130 handles the generation of candidate query execution plans for a query and the selection of a query execution plan from the candidate query execution plans that is used to execute the query. When execution planner 130 receives a tree associated with a query from query manager 125, execution planner 130 generates a set of candidate query execution plans for the query based on the tree. In some embodiments, a query execution plan is a set of operations that when executed by execution manager 135 generates query results for the query. The set of operations of a query execution plan may include operations for accessing data in one or more databases 155a-n, calculating and/or deriving other data from the data in the one or more databases 155a-n, performing operations (e.g., join operations, intersection operations, union operations, etc.) on the data in the one or more databases 155a-n, filtering the data in the one or more databases 155a-n, etc., or any combination thereof. Once execution planner 130 selects a query execution plan from the set of candidate query execution plans, execution planner 130 sends the selected query execution plan to execution manager 135 for execution.

Execution manager 135 is responsible for managing the execution of query execution plans in order to generate query results for queries. Execution manager 135 may access one or more databases 155a-n to retrieve data specified in the query execution plan. Based on a query execution plan, execution manager 135 may then send the data to join engine 140, intersection engine 145, and/or data processing engine(s) 150 and instruct them to perform data processing operations in order to generate a query result for the query execution plan. For example, execution manager 135 may instruct join engine 140 perform join operations, intersection engine 145 to perform intersection operations, and/or data processing engine(s) 150 to perform other types of operations, as discussed below. Once execution manager 135 receives results from join engine 140, intersection engine 145, and/or data processing engine(s) 150, execution manager 135 generates query results for the query and sends the query results to query manager 125.

Join engine 140 is configured to perform join operations on different sets of data. Examples of join operations may include inner join operations, outer join operations (e.g., left outer join operations, right outer join operations, full outer join operations, etc.), cross join operations, etc. Join engine 140 may receive from execution manager 135 one or more sets of data and one or more specified join operations to perform on the sets of data. Upon performing the specified join operations on the sets of data, join engine 140 returns the results of the join operations to execution manager 135.

Figure 2E:
Figure 2E:
Figure 2E:

In some embodiments, join engine 140 performs a join operation on different sets of data in three phases: a reduction phase, a materialization phase, and a projection phase. An example of a reduction operation will now be described by reference to FIGS. 2A-2E, which illustrate three tables 200-220 through five stages of a reduction phase of a join operation. As shown in FIG. 2A, table 200 (referred to as Table A) includes nine rows of data and each row includes a value for an a attribute and an x attribute, table 210 (referred to as Table B) includes nine rows of data and each row includes a value for an x attribute and an y attribute, and table 220 (referred to as Table C) includes nine rows of data and each row includes a value for an y attribute and an c attribute. For this example, join engine 140 receives tables 200-220 from execution manager 135 and a join operation based on the following query:

SELECT A.a, C.c FROM A, B, C WHERE A.x=B.x AND B.y=C.y

The query execution plan selected by execution planner 130 in this example specifies the following sequence of reduction operations for the reduction phase of the join operation:

A.x→B.x, B.y→C.y, C.y→B.y, B.x→A.x

That is, the first reduction operation is to reduce from table A to table B based on attribute x, the second reduction operation is to reduce from table B to table C based on attribute y, the third reduction operation is to reduce from table C to table B based on attribute y, and the fourth reduction operation is to reduce from table B to table A based on attribute x.

In the first reduction operation, join engine 140 determines the distinct values in the attribute of table A that is part of the join operation, which is attribute x in this example. The distinct values in attribute x of table A are the following: {1, 2, 3, 5, 8, 9}. Join engine 140 then reduces table B by removing the rows in table B having a value in the corresponding attribute (i.e., attribute x) that is not included in the distinct values in the attribute x of table A. FIG. 2B illustrates table B after the first reduction operation. As shown, rows 4 and 6-8 have been removed from table B since the values of attribute x for those rows (i.e., 4, 6, and 7) are not included in the distinct values in attribute x of table A.

For the second reduction operation, join engine 140 determines the distinct values in the attribute of table B illustrated in FIG. 2B that is part of the join operation, which is attribute y in this example. The distinct values in attribute y of table B shown in FIG. 2B are the following: {1, 2, 5, 9}. Next, join engine 140 reduces table C by removing the rows in table C having a value in the corresponding attribute (i.e., attribute y) that is not included in the distinct values in the attribute y of table B. FIG. 2C illustrates table C after the second reduction operation. As illustrated, rows 1, 2, 4 and 7 have been removed from table C since the values of attribute y for those rows (i.e., 4, 6, 7, and 8) are not included in the distinct values in attribute y of table B.

In the third reduction operation, join engine 140 determines the distinct values in the attribute of table C shown in FIG. 2C that is part of the join operation, which is attribute y in this example. The distinct values in attribute y of table C are the following: {1, 5, 9}. Join engine 140 then reduces table B by removing the rows in table B having a value in the corresponding attribute (i.e., attribute y) that is not included in the distinct values in the attribute y of table C. FIG. 2D illustrates table B after the third reduction operation. As shown, rows 1 and 5 have been removed from table B since the values of attribute y for those rows (i.e., 2) are not included in the distinct values in attribute y of table C.

For the fourth reduction operation, join engine 140 determines the distinct values in the attribute of table B illustrated in FIG. 2D that is part of the join operation, which is attribute x in this example. The distinct values in attribute x of table B are the following: {2, 3, 9}. Next, join engine 140 reduces table A by removing the rows in table A having a value in the corresponding attribute (i.e., attribute x) that is not included in the distinct values in the attribute x of table B. FIG. 2E illustrates table A after the fourth reduction operation. As illustrated, rows 1, 3, 6, 7 and 9 have been removed from table A since the values of attribute x for those rows (i.e., 1, 5 and 8) are not included in the distinct values in attribute x of table B.

In the materialization phase of the join operation, join engine 140 generates a list of row combinations in tables A, B, and C that satisfy the join operation. In this example, join engine 140 generates a list of row combinations in tables A, B, and C that satisfy the WHERE clause of the join operation (i.e., A.x=B.x AND B.y=C.y). The list of row combinations for this example is the following:

(A, B, C)=(2, 3, 5), (2, 3, 6), (4, 2, 8), (4, 2, 9), (5, 3, 5), (5, 3, 6), (8, 9, 3)

Finally, for the projection phase of the join operation, join engine 140 generates a set of results for the join operation based on the list of row combinations. For each row combination, join engine 140 identifies the corresponding attribute values specified in the join operation (A.a and C.c in this example) and generates a result for the set of results. For this example, join engine 140 generates the following set of results:

(A.a, C.c)=(10, 35), (10, 75), (20, 55), (20, 45), (30, 35), (30, 75), (80, 25)

Referring back to FIG. 1, intersection engine 145 is responsible for performing intersection operations on different sets of data. In some embodiments, an intersection operation on two or more sets of data determines data that appears each of the sets of data. Each set of data may be data in a table, query results of a query, etc. Intersection engine 145 may also be responsible for performing union operations on different sets of data in some embodiments since the union of different sets of data can be calculated using an intersection operation. For example, the union and intersection of two finite sets A and B can be expressed as the following:

|A∪B|=|A|+|B|−|A∩B|

Intersection engine 145 can receive from execution manager 135 two or more sets of data and a specified intersection or union operation to perform on the sets of data. Upon performing the intersection or union operation on the sets of data, intersection engine 145 returns the results of the operation to execution manager 135.

Data processing engine(s) 150 includes one or more data processing engines that execution manager 135 utilizes to perform operations on data in order to execute a query. For instance, data processing engine(s) 150 may include a union engine configured to perform union operations on different sets of data, a calculation engine configured to calculate and/or derive data (e.g., determine the number of records in the one or more sets of data, determine the number of records in the one or more sets of data that have unique values of an attribute, calculate an average of values of an attribute in the one or more sets of data, etc.), a selection/filter engine configured to select and/or filter data from one or more sets of data, etc. One of ordinary skill in the art will appreciate that any number of additional and/or different data processing engines may be included in data processing engine(s) 150.

Databases 155a-n are each configured to store data managed by DBMS 120. In some embodiments, one or more databases 155a-n are in-memory databases. In some such embodiments, an in-memory database stores data in memory (e.g., random access memory (RAM)). In some embodiments, databases 155a-n may be included in DBMS 120. In other embodiments, some databases 155a-n are included in DBMS 120 while other databases 155a-n are separate from DBMS 120 (e.g., implemented on one or more remote systems). Still, in some embodiments, databases 155a-n are separate from DBMS 120 (e.g., implemented on one or more remote systems).

As mentioned above, execution planner 130 is configured to handle the generation of candidate query execution plans for a query and the selection of a query execution plan from the candidate query execution plans. Execution planner 130 can generate different candidate query execution plans based on different types of queries. For instance, a query may include an intersection operation in some cases. The intersection operation may be an intersection of different types of data such as integers, real numbers, floating point numbers, dates, times, etc. Execution planner 130 employs a number of different techniques to select a query execution plan from a set of candidate query execution plans for a query that includes an intersection operation on two or more sets of strings. In some embodiments, execution planner 130 determines an execution cost for each candidate query execution plan in the set of candidate query execution plans and selects a query execution plan from the set of candidate query execution plans based on the execution costs (e.g., the query execution plan having the lowest execution cost).

The execution cost associated with a candidate query execution plan for a query that includes an intersection operation on two or more sets of strings may be based on the number of strings in each set of strings that is included in the intersection. In some embodiments, execution planner 130 uses a technique for estimating the number strings in a set of strings that is included in the intersection of the two or more sets of strings. The following will describe the operation of such a technique to estimate the number of strings in each of two sets of strings that is included in the intersection of two sets of strings.

First, execution planner 130 determines the number of strings in the first set of strings and the number of strings in the second set of strings. As an example, execution planner 130 may determine that the first set of strings has 500 strings and the second set of strings has 600 strings. Next, execution planner 130 determines a string interval of the first set of strings and a string interval for the second set of strings. In some embodiments, a string interval of a set of strings represents the range of the set of strings based on an alphabetical order of the strings. The string interval of a set of strings may be represented by [string x, string y], where string x represents the first string in the set of strings according to an alphabetical ordering of the set of strings and string y represents the last string in the set of strings according to the alphabetical ordering of the set of strings. Continuing with the above example, execution planner 130 may determine the string interval for the first set of strings (which has 500 strings) is ["Car", "JohnDeere"] and the string interval for the second set of strings (which has 600 strings) is ["Bike", "Harley"].

After determining string intervals for the first and second sets of strings, execution planner 130 determines a string interval of the intersection of the first and second sets of strings. In some embodiments, a string interval of an intersection of different sets of strings represents the range of the intersection of the different sets of strings. In some embodiments, execution planner 130 determines a string interval of an intersection of different sets of strings based on the string intervals of the different sets of strings. Continuing with the example above, execution planner 130 determines the string interval of the intersection of the first and second sets of strings as ["Car", "Harley"]. The intersection of the first and second sets of strings includes the string "Car" because the string "Car" is alphabetically ordered after the string "Bike" and before the string "Harley". Thus, the string "Car" is included in both string intervals of the first and second sets of strings. The string "Bike" is not included in the intersection of the first and second sets of strings because the string "Bike" is alphabetically ordered before the string "Car". As such, the string "Bike" is not included in both string intervals of the first and second sets of strings. The intersection of the first and second sets of strings includes the string "Harley" because the string "Harley" is alphabetically ordered before the string "JohnDeere" and after the string "Car". Therefore, the string "Harley" is included in both string intervals of the first and second sets of strings. The string "JohnDeere" is not included in the intersection of the first and second sets of strings because the string "JohnDeere" is alphabetically ordered after the string "Harley". Accordingly, the string "JohnDeere" is not included in both string intervals of the first and second sets of strings.

Next, execution planner 130 determines relative interval lengths for the string interval of the first set of strings, the string interval of the second set of strings, and the string interval of the intersection of the first and second sets of strings. Execution planner 130 can determine a relative interval length for a string interval by generating numerical representations of the endpoints of the string interval. In some embodiments, execution planner 130 uses an American Standard Code for Information Interchange (ASCII)-based character encoding to generate the numerical representations. In some such embodiments, execution planner 130 determines the string length (i.e., the number of characters in the string) of the longest string in the endpoints of the string intervals of the first and second sets of strings. Continuing with the above example, execution planner 130 determines the string length of the longest string as nine since "JohnDeere" is the longest string among the four strings "Car", "JohnDeere", "Bike", and "Harley".

Once the longest string is determined, execution planner 130 converts each character in the endpoints of each of the string intervals of the first and second sets of strings into numbers using the following ASCII-based character encoding equation (1):

$$C_n(C_d) = C_d + 1$$

where $C_n$ is the converted number and $C_d$ is the decimal encoding of the ASCII character. Continuing with the example above, execution planner 130 converts characters for the string "Car" into the numbers "C"=68, "a"=98, and "r"=115 since the ASCII character encodings for the characters "C," "a," and "r" are 67, 97, and 114, respectively. Characters for the string "JohnDeere" are converted into the numbers "J"=75, "o"=112, "h"=105, "n"=111, "D"=69, "e"=102, "e"=102, "r"=115, and "e"=102. Characters for the string "Bike" are converted into the numbers "B"=67, "i"=106, "k"=108, and "e"=102. Characters for the string "Harley" are converted into the numbers "H"=73, "a"=98, "r"=115, "l"=109, "e"=102, and "y"=123.

Next, execution planner pads the right side of each string of the endpoints of the string intervals of the first and second sets of strings with a number of non-existent characters. In some embodiments, a non-existent character is given an encoding according to equation (1) of $C_d = -1$ and, thus, $C_n = 0$. As such, the non-existent character is a not an ASCII character. The number of non-existent characters used for right-padding a string is selected such that the length of the string becomes equal to the length of the longest string determined above. Continuing with the above example, execution planner 130 pads the string "Car" with six non-existent characters so that the string length of the string "Car" is equal to nine. Similarly, execution planner 130 pads the string "Bike" with five non-existent characters and the string "Harley" with three non-existent characters. Execution planner 130 does not pad the string "JohnDeere" because it is the string with the longest string length.

Execution planner 130 then generates relative interval lengths of the strings of the endpoints of the string intervals of the first and second sets of strings using the padded strings. Specifically, execution planner 130 calculates nonnegative integer representations of the strings of the endpoints of the string intervals of the first and second sets of strings using the following equation (2):

$$f(s) = \sum_{i=0}^{L-1} C_n(s[i]) * 257^i$$

where string s=s[L−1] s[1] s[0] of length L, composed of characters s[i], 0<=i<L and $C_n$ is the function defined by equation (1) above. In the example above, the padded strings of the endpoints of the string intervals have of common length L=9, which are illustrated as follows:
 $s_1$="Car••••••"
 $s_2$="JohnDeere"
 $s_3$="Bike•••••"
 $s_4$="Harley•••"
where • represents the non-existent character. In some embodiments, a Homer method/scheme is used to evaluate equation (2). Applying equation (2) to the four example strings is as follows:
f($s_1$)=(((((((68*257+98)*257+115)*257+0)*257+0)*257+0)*257+0)*257+0)*257+0
f($s_2$)=(((((((75*257+112)*257+105)*257+111)*257+69)*257+102)*257+102)*257+115)*257+102
f($s_3$)=(((((((67*257+106)*257+108)*257+102)*257+0)*257+0)*257+0)*257+0)*257+0
f($s_4$)=(((((((73*257+98)*257+115)*257+109)*257+102)*257+123)*257+0)*257+0)*257+0

Execution planner 130 calculates the nonnegative integer representations of the four strings as follows:
 f($s_1$)=1,301,408,213,339,828,289,817
 f($s_2$)=1,435,660,208,953,343,906,173
 f($s_3$)=1,282,967,572,016,625,845,631
 f($s_4$)=1,396,564,075,990,776,992,876

Based on the nonnegative integer representations, execution planner 130 determines a relative interval length of the string interval of the intersection of the first and second sets of strings with respect to each string interval of the first and second sets of strings. In particular, execution planner 130 determines the relative interval length of the string interval of the intersection of the first and second sets of strings with respect to the string interval of the first set of strings using the following equation (3):

$$rel_1 = rel([s_j, s_4], [s_1, s_2]) = (f(s_4) - f(s_1))/(f(s_2) - f(s_1))$$

Execution planner 130 then determines the relative interval length of the string interval of the intersection of the first and second sets of strings with respect to the string interval of the second set of strings using the following equation (4):

$$rel_2 = rel([s_1, s_4], [s_3, s_4]) = (f(s_4) - f(s_1))/(f(s_4) - f(s_3))$$

Continuing with the example above, execution planner 130 determines the relative interval lengths as follows:

$$rel_1 = \left(\frac{1,396,564,075,990,776,992,876 - }{1,301,408,213,339,828,289,817}\right)/$$
$$\left(\frac{1,435,660,208,953,343,906,173 - }{1,301,408,213,339,828,289,817}\right)$$
$$= 0.70878546137134$$

$$rel_2 = \left(\frac{1,396,564,075,990,776,992,876 - }{1,301,408,213,339,828,289,817}\right)/$$

$$\left( \frac{1{,}396{,}564{,}075{,}990{,}776{,}992{,}876 -}{1{,}282{,}967{,}572{,}016{,}625{,}845{,}631} \right)$$
$$= 0.8376654150606724$$

Once execution planner 130 determines the relative interval length of the string interval of the intersection with respect to the string interval of the first and second sets of strings, execution planner 130 determines the number of strings that are included in the intersection of the first and second sets of strings. In some embodiments, execution planner 130 determines this number of strings by multiplying the determined relative interval lengths by the number of strings in the corresponding set of strings in order to calculate the number of strings in the set of strings that are included in the intersection and determining the minimum between the two calculated numbers of strings. Continuing with the above example, execution planner 130 calculates the number of strings in the first set of strings that are included in the intersection as the following:

500*0.70878546137134=354.393

Thus, 354.393 is the number of strings in the string interval $[s_1,s_2]$ that is estimated to be in the string interval of the intersection $[s_2,s_4]$. Execution planner 130 calculates the number of strings in the first set of strings that are included in the intersection as the following as the following:

600*0.8376654150606724=502.599

Accordingly, 502.599 is the number of strings in the string interval $[s_3,s_4]$ that is estimated to be in the string interval of the intersection $[s_1,s_4]$. Execution planner 130 then determines the minimum between the two numbers of strings according to the following:

min (354.393, 502.599)=354.393 where min( ) is a function that determines the minimum number in a set of numbers. As such, execution planner 130 determines the number of strings that are included in the intersection of the first and second sets of strings to be 354.393 strings.

As discussed above, execution planner 130 can generate different candidate query execution plans based on different types of queries. As another example, a query may include a join operation in some instances. A query execution plan for a query that includes a join operation may include a set of reduction operations for the reduction phase of the join operation. Different query execution plans for such a query can include different sets of reduction operations.

The execution cost associated with a set of reduction operations of a candidate query execution plan for a query that includes a join operation can be based on the number of distinct values of an attribute used to perform a reduction operation. In some embodiments, execution planner 130 uses a technique for estimating the number distinct values in an attribute of a table to determine the execution cost associated with a reduction operation. Execution planner 130 may use such a technique to determine an execution cost associated with the reduction operations of each candidate query execution plan in the set of candidate query execution plans. Execution planner 130 then selects a query execution plan from the set of candidate query execution plans based on the execution costs (e.g., the query execution plan having the lowest execution cost).

An example operation of a technique to estimate the number distinct values in an attribute of a table will now be described. For this example, execution planner 130 receives a tree for the following join query:

SELECT X.a, Z.d FROM X, Y, Z WHERE X.b=Y.b AND Y.c=Z.c

In this example, execution planner 130 generates a candidate query execution plan that includes the following set of reduction operations described above:

X.b→Y.b, Y.c→Z.c, Z.c→Y.c, Y.b→X.b

In this query execution plan, the first reduction operation is to reduce from table X to table Y based on the attribute b, the second reduction operation is to reduce from table Y to table Z based on the attribute c, the third reduction operation is to reduce from table Z to table Y based on the attribute c, and the fourth reduction operation is to reduce from table Y to table X based on the attribute b. To determine the execution cost associated with a reduction operation, execution planner 130 determines the total number of rows in a first table whose distinct values will be used to reduce rows in a second table. Referring to the first reduction operation as an example, execution planner 130 determines the total number of rows in table X.

Next, execution planner 130 selects a subset of the rows in the first table, which is table X in this example. Execution planner 130 then determines the number of distinct values in the attribute of the subset of rows in the first table that will be used in the join operation. In other words, execution planner 130 is selecting a sample of rows in the first table and determining the distinct values in an attribute of the sample of rows in the first table. Continuing with the example, execution planner 130 determines the distinct values in the attribute b of the subset of rows in table X. Next, execution planner 130 estimates the number of distinct values in an attribute of the first table using the following equation (5):

$$D = \frac{h*N}{h+N}$$

where $$h = \frac{2}{pi}*S*\tan\left(\frac{pi}{2}*\frac{d}{S}\right)$$

and where N is the total number of rows in the first table, S is the selected subset of rows in the first table, d is the number of distinct values in an attribute of the subset of rows in the first table that will be used in a join operation (attribute b of table X in this example), and D is the estimated number of distinct values in the attribute of the first table. In some embodiments, execution planner 130 estimates the number of distinct values in the attribute of the first table as the larger of the two values d and D. Execution planner 130 then determines the execution cost associated with the reduction operation using the following equation (6):

$$\mathrm{cost}_{reduction} = \mathrm{fix} + \mathrm{var}*D$$

where $\mathrm{cost}_{reduction}$ is an execution cost of the reduction operation, fix is a fixed execution cost associated with interprocess communication between the first table and the second table, var is a variable execution cost associated with interprocess communication between the first table and the second table, and D is the number of distinct values of the join attribute of a first table and a second table that is to be used to reduce from the first table to the second table. In some embodiments, D is determined using equation (5). In some embodiments, fix and var are predefined constants that are independent of D. fix and var describe the cost of interprocess communication between a host of the first table and a host of the second table. fix represents the setup cost of the communication which is independent of the volume of data in the first and second tables. var is the proportionality factor associated with the data volume. In some embodiments, fix and var depend on the technical nature of the communication. For example, the fix and var execution costs associated with establishing a remote interprocess communication between the first and second tables (e.g., the first and second tables are stored in different databases, systems, servers, hosts, etc.) may be higher than the execution cost associated with establishing a local interprocess communication between the first and second tables (e.g., the first and second tables are stored in the same database, system, server, host, etc.).

To determine the execution cost associated with the second reduction operation in this example, execution planner 130 estimates the number of rows in table Y that will remain upon execution of the first reduction operation. That is, execution planner 130 estimates the number of rows that table Y will have upon execution of the first reduction operation without actually performing the first reduction operation. To estimate the number of rows that will remain in a table upon execution of a reduction operation, execution planner 130 determines the total number of rows in the table, determines the number of distinct values in the table, and then uses the following equation (7):

$$y(D) = \frac{2}{pi} * S * \arctan\left(\frac{pi}{2} * \frac{N}{S} * \frac{D}{N-D}\right)$$

where N is the total number of rows in the table, D is the number of distinct values in an attribute of the table (attribute b of table Y in this example) on which a reduction operation is to be performed, S is the number of rows that will remain in the table upon execution of the reduction operation, and y(D) is the estimated number of distinct values that is used to reduce the table based on the attribute of the table. In some embodiments, execution planner 130 determines the value of D using equation (5) and a selected sample of rows in the table. Since execution planner 130 has the values for N, D, and y(D), execution planner 130 solves for S to calculate the number of rows that will remain in the table upon execution of the reduction operation. In some embodiments, execution planner 130 solves for S using a Newton/Newton-Raphson method.

Next, execution planner 130 determines the execution cost associated with reducing table Y to table Z by determining the number of distinct values in the attribute of table Y (attribute c of table Y in this example) that will be used in the join operation based on the calculated number of rows that will remain in table Y upon execution of the first reduction operation (i.e., reducing table X to table Y based on attribute b). In some embodiments, execution planner 130 determines the number of distinct values using equation (7) where N is the total number of rows in the table, D is the number of distinct values in an attribute of the table (attribute c of table Y in this example) that will be used in a reduction operation, and S is the estimated number of rows that will remain in table Y upon execution of the first reduction operation. y(D) is the estimated number of distinct values in the attribute of the table based on the table having been reduced to R number of rows. Execution planner 130 then uses value calculated for y(D) for the variable D in equation (6) above to determine the execution cost associated with the second reduction operation.

Execution planner 130 determines the execution cost associated with the third and fourth reduction operations in the same manner described above for determining the execution cost associated with the second reduction operation. That is, execution planner 130 estimates the number of rows in table Z that will remain upon execution of the second reduction operation; determines the execution cost associated with reducing table Z to table Y by determining the number of distinct values in the attribute c of table Z based on the calculated number of rows that will remain in table Z upon execution of the second reduction operation (i.e., reducing table Y to table Z based on attribute c); estimates the number of rows in table Y that will remain upon execution of the third reduction operation; and determines the execution cost associated with reducing table Y to table X by determining the number of distinct values in the attribute b of table Y based on the calculated number of rows that will remain in table Y upon execution of the third reduction operation (i.e., reducing table Z to table Y based on attribute c).

The above example illustrates determining execution costs associated with reduction operations of a candidate query execution plan for a query that includes a join operation. Execution planner 130 may generate, based on a query, different query execution plans that each have different sets of reduction operations. For example, for the example join query used in the example above, execution planner 130 may generate a candidate query execution plan that includes the following set of reduction operations:

Y.b→X.b||Y.c→Z.c, Z.c→Y.c||X.b→Y.b, Y.b→X.b||Y.c→Z.c where || represents reduction operations performed in parallel. For this example set of reduction operations, the first reduction operation is to reduce in parallel table Y to table X based on the attribute b and table Y to table Z based on the attribute c. The second reduction operation is to reduce in parallel table Z to table Y based on the attribute c and table X to table Y based on the attribute b. The third reduction operation is to reduce in parallel table Y to table X based on the attribute b and table Y to table Z based on the attribute c. Execution planner 130 may use the same or similar techniques described above to determine the execution costs associated with the reduction operations in this example query execution plan.

FIG. 1 shows a system in which a client device, a computing device, and an application interacts with a DBMS. One of ordinary skill in the art will understand that any number of additional and/or different devices, systems, and/or applications that are configured to communicate and interact with the DBMS may be supported in the system illustrated in FIG. 1. For example, a web server, a remote function call (RFC) server, and/or an RFC application may be included in the system shown in FIG. 1. In addition, FIG. 1 illustrates a join engine, an intersection, and data processing engine(s) as separate elements in DBMS 120. One of ordinary skill in the art will recognize that two or more of these elements may be implemented in as a single elements. For example, the join engine and the intersection engine may be implemented as a single engine. In some embodiments, some or all of these elements may be implemented as part of execution manager 135.

Figure 3:
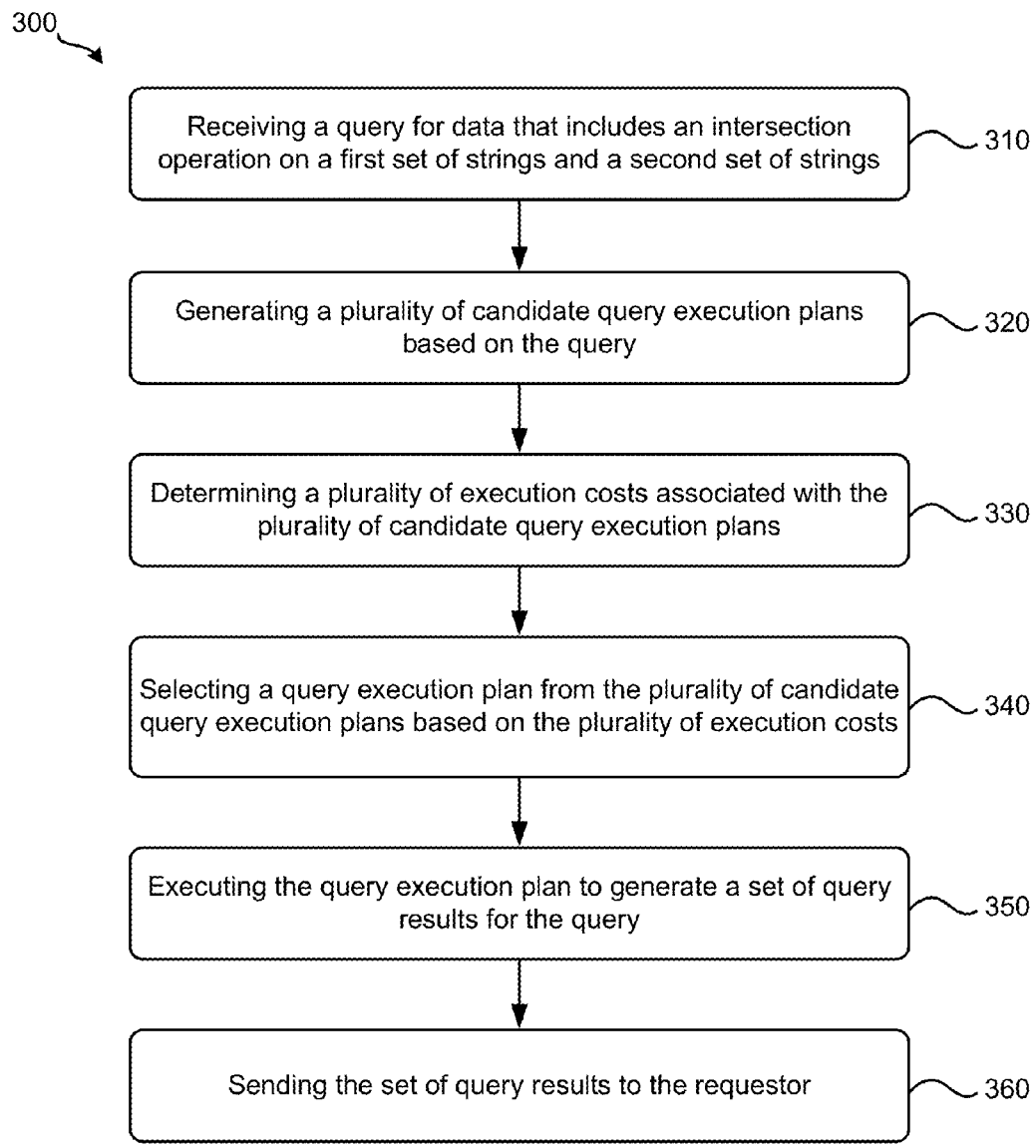
FIG. 3 illustrates a process for processing a query that includes an intersection operation according to some embodiments.

FIG. 3 illustrates a process 300 for processing a query that includes an intersection operation according to some embodiments. In some embodiments, DBMS 120 performs process 300. Process 300 starts by receiving, at 310, a query for data that includes an intersection operation on a first set of strings and a second set of strings. In some embodiments, process 300 receives the query from client device 105, computing system 110, or application 115. Next, process 300 generates, at 320, a plurality of candidate query execution plans based on the query. In some embodiments, execution planner 130 performs operation 320.

Process 300 then determines, at 330, a plurality of execution costs associated with the plurality of candidate query execution plans. In some embodiments, the execution cost associated with a candidate query execution plan is based on a number of strings in the first set of strings that is included in the intersection of the first and second sets of strings and a number of strings in the second set of strings that is included in the intersection of the first and second sets of strings. Process 300 may perform process 400 described below by reference to FIG. 4 to determine these numbers of strings. Execution planner 130 may perform operation 330 in some embodiments.

Next, process 300 selects, at 340, a query execution plan from the plurality of query execution plans based on the plurality of execution costs. Once process 300 has selected a query execution plan, process 300 then executes, at 350, the query execution plan in order to generate a set of query results for the query. In some embodiments, execution manager 135 and/or intersection engine 145 performs operation 350. Finally, process 300 sends, at 360, the set of query results to the requestor from which process 300 received the query.

Figure 4:
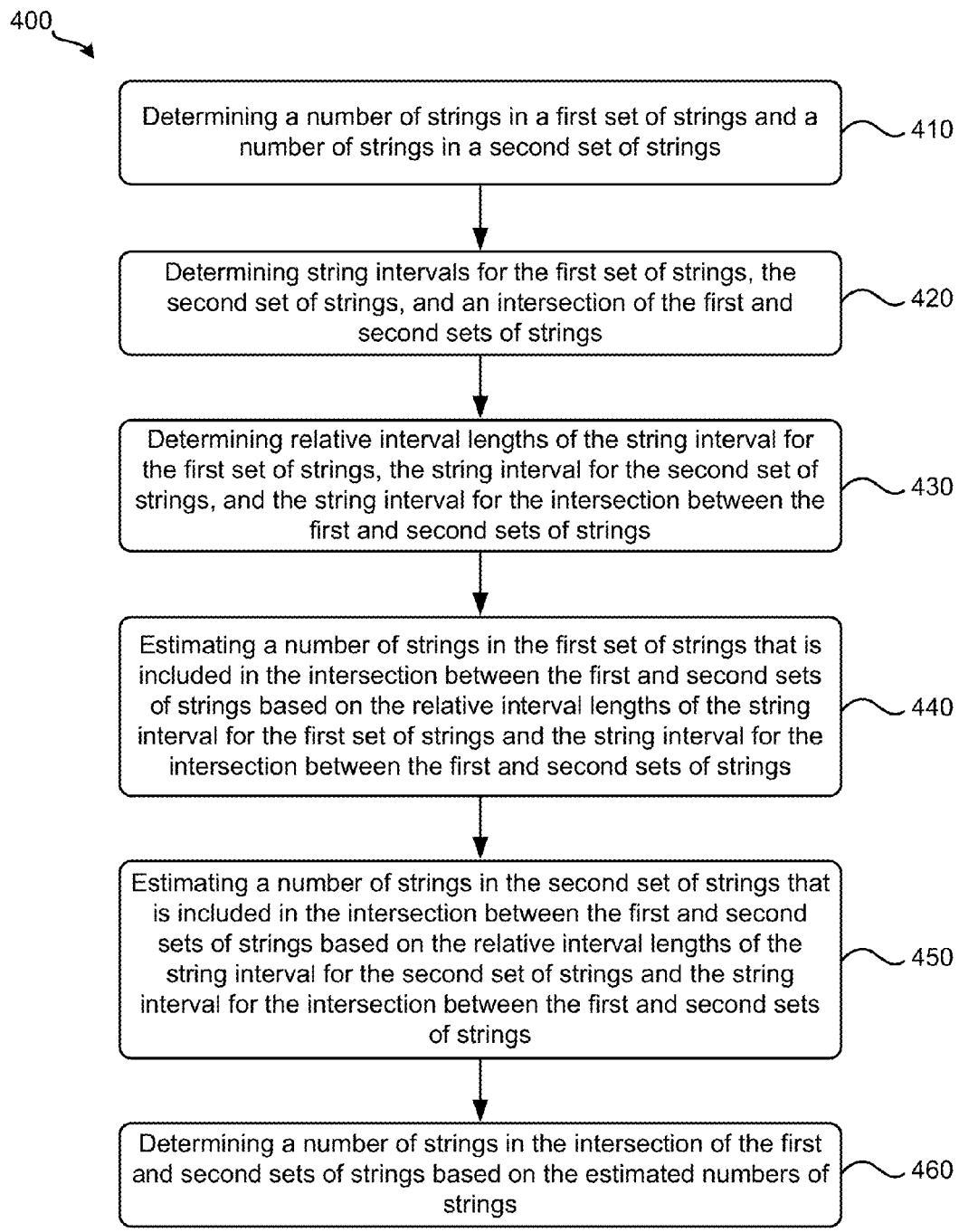
FIG. 4 illustrates a process for estimating string intersections according to some embodiments.

FIG. 4 illustrates a process 400 for estimating string intersections according to some embodiments. In some embodiments, process 300 performs process 400 as part of operation 330 to estimate string intersections of two sets of strings. Execution planner 130 may perform process 400. Process 400 begins by determining, at 410, a number of strings in a first set of strings and a number of strings for a second set of strings.

Next, process 400 determines, at 420, string intervals for the first set of strings, the second set of strings, and an intersection of the first and second sets of strings. As explained above, a string interval of a set of strings represents the range of the set of strings based on an alphabetical order of the strings, in some embodiments. Process 400 then determines, at 430, relative interval lengths of the string intervals for the first set of strings, the second set of strings, and the intersection of the first and second sets of strings. In some embodiments, process 400 determines these relative interval lengths in the same and/or similar manner as that described above by reference to equations (1) and (2).

After operation 430, process 400 estimates, at 440, a number of strings in the first set of strings that is included in the intersection between the first and second sets of strings based on the relative interval lengths of the string interval for the first set of strings and the string interval for the intersection between the first and second sets of strings. In some embodiments, process 400 estimates the number of strings in the same and/or similar manner as that described above by reference to equations (3) and (4).

Next, process 400 estimates, at 450, a number of strings in the second set of strings that is included in the intersection between the first and second sets of strings based on the relative interval lengths of the string interval for the second set of strings and the string interval for the intersection between the first and second sets of strings. In some embodiments, process 400 estimates the number of strings in the same and/or similar manner as that described above by reference to equations (3) and (4). Finally, process 400 determines, at 460, a number of strings in the intersection of the first and second sets of strings based on the estimated numbers of strings. In some embodiments, process 400 determines the lower of the two estimated numbers of strings as the number of strings in the intersection of the first and second sets of strings.

The examples and embodiments explained above by reference to FIGS. 1, 3, and 4 describe string intersections of two sets of strings. One of ordinary skill in the art will appreciate that the same and/or similar techniques may be used for estimating string intersections of any number of sets of strings.

Figure 5:
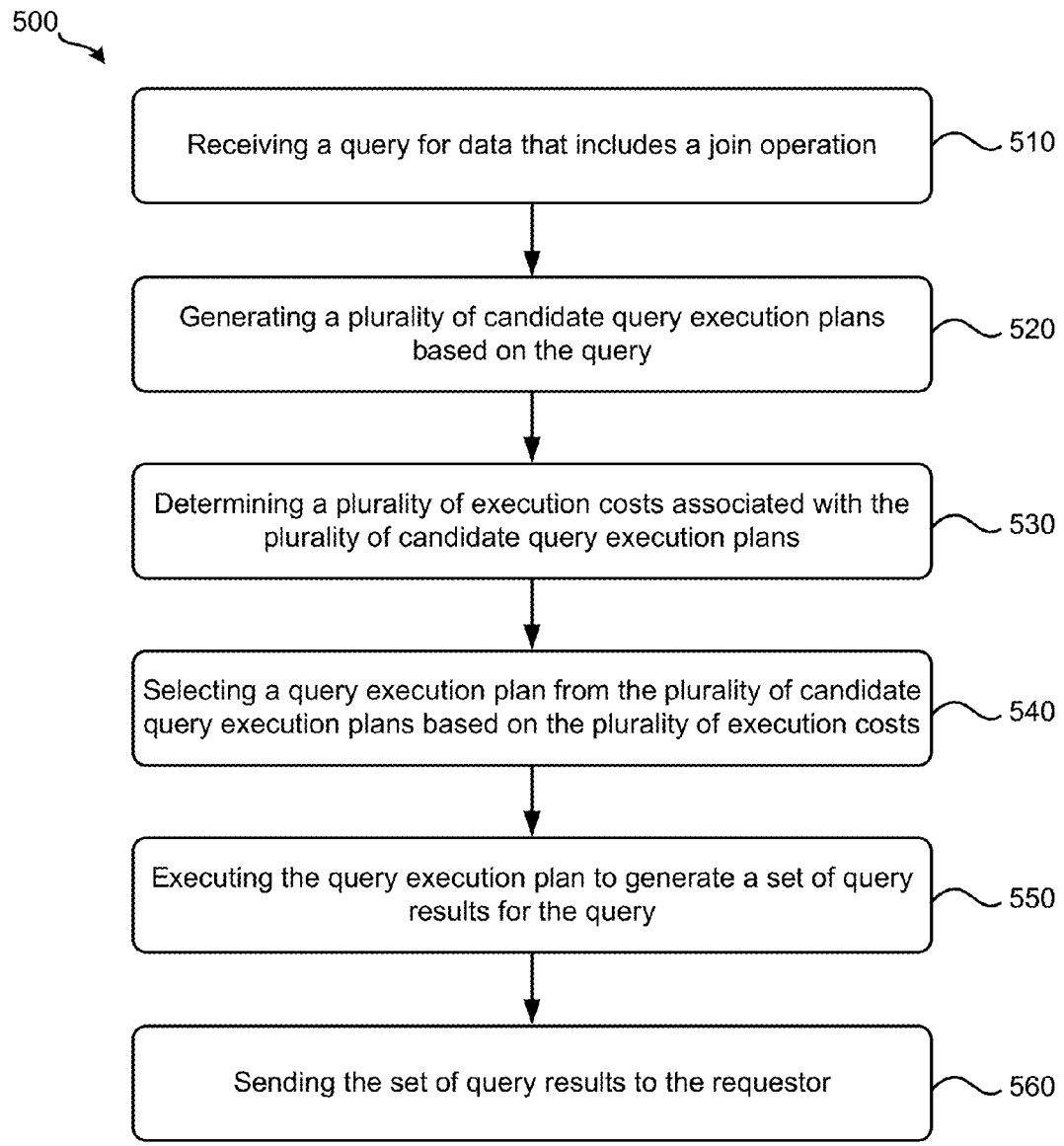
FIG. 5 illustrates a process for processing a query that includes a join operation according to some embodiments.

FIG. 5 illustrates a process 500 for processing a query that includes a join operation according to some embodiments. In some embodiments, DBMS 120 performs process 500. Process 500 starts by receiving, at 510, a query for data that includes a join operation. In some embodiments, process 500 receives the query from client device 105, computing system 110, or application 115. Next, process 500 generates, at 520, a plurality of candidate query execution plans based on the query. Each candidate query execution plan can include a set of reduction operations. In some embodiments, execution planner 130 performs operation 520.

After operation 520, process 500 determines, at 530, a plurality of execution costs associated with the plurality of candidate query execution plans. In some embodiments, the execution cost associated with a candidate query execution plan is based on execution costs associated with the set of reduction operations of the candidate query execution plan. The execution costs associated with the set of reduction operations of the candidate query execution plan may be based on a number of distinct values in an attribute that is used in the join operation. Process 500 may perform process 600 described below by reference to FIG. 6 to determine this number of distinct values. Execution planner 130 may perform operation 530 in some embodiments.

Next, process 500 selects, at 540, a query execution plan from the plurality of query execution plans based on the plurality of execution costs. Process 500 then executes, at 550, the query execution plan in order to generate a set of query results for the query. In some embodiments, execution manager 135 and/or join engine 140 performs operation 550. Finally, process 500 sends, at 560, the set of query results to the requestor from which process 500 received the query.

Figure 6:
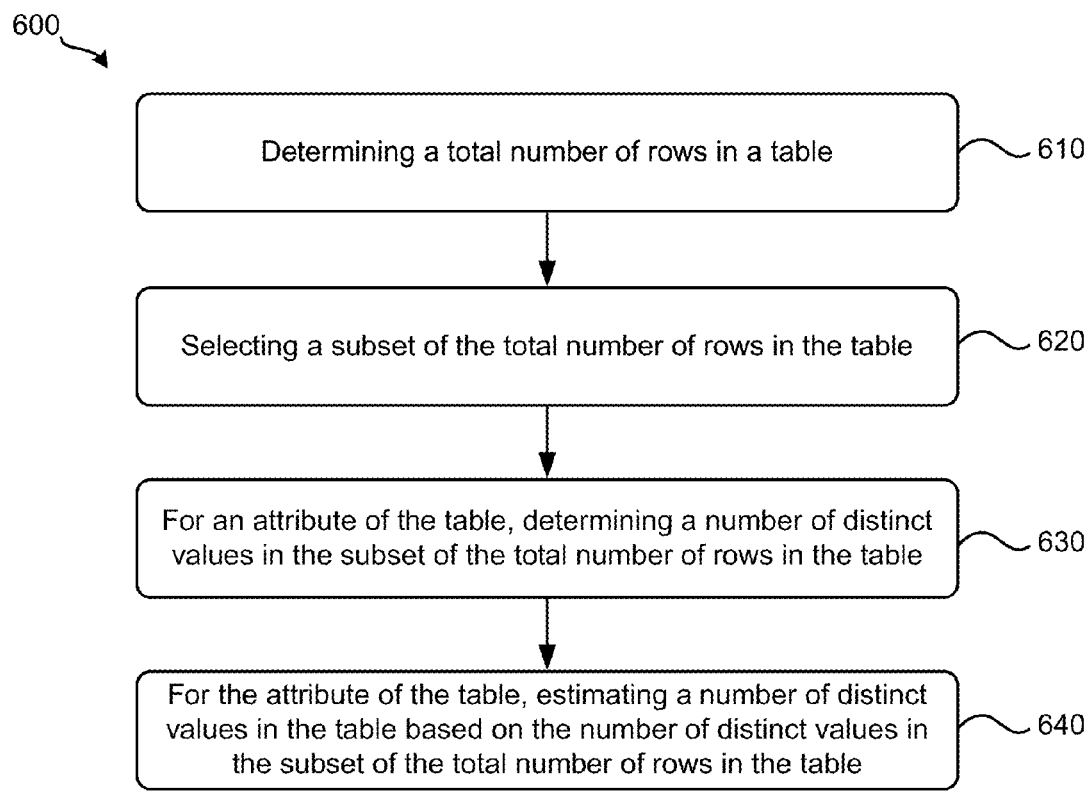
FIG. 6 illustrates a process for estimating distinct values of an attribute according to some embodiments.

FIG. 6 illustrates a process 600 for estimating distinct values of an attribute according to some embodiments. In some embodiments, process 500 performs process 600 as part of operation 530 to estimate a number of distinct values in an attribute. Execution planner 130 may perform process 600. Process 600 begins by determining, at 610, a total number of rows in a table.

Next, process 600 selects, at 620, a subset of the total number of rows in the table. Process 600 then determines, at 630, a number of distinct values in the subset of the total number of rows in the table for an attribute of the table. In some embodiments, the attribute of the table is the attribute that will be used for a join operation. Finally, process 600 estimates a number of distinct values in the table based on the number of distinct values in the subset of the total number of rows in the table. In some embodiments, process 600 uses equation (5) above to estimate the number of distinct values.

Figure 7:
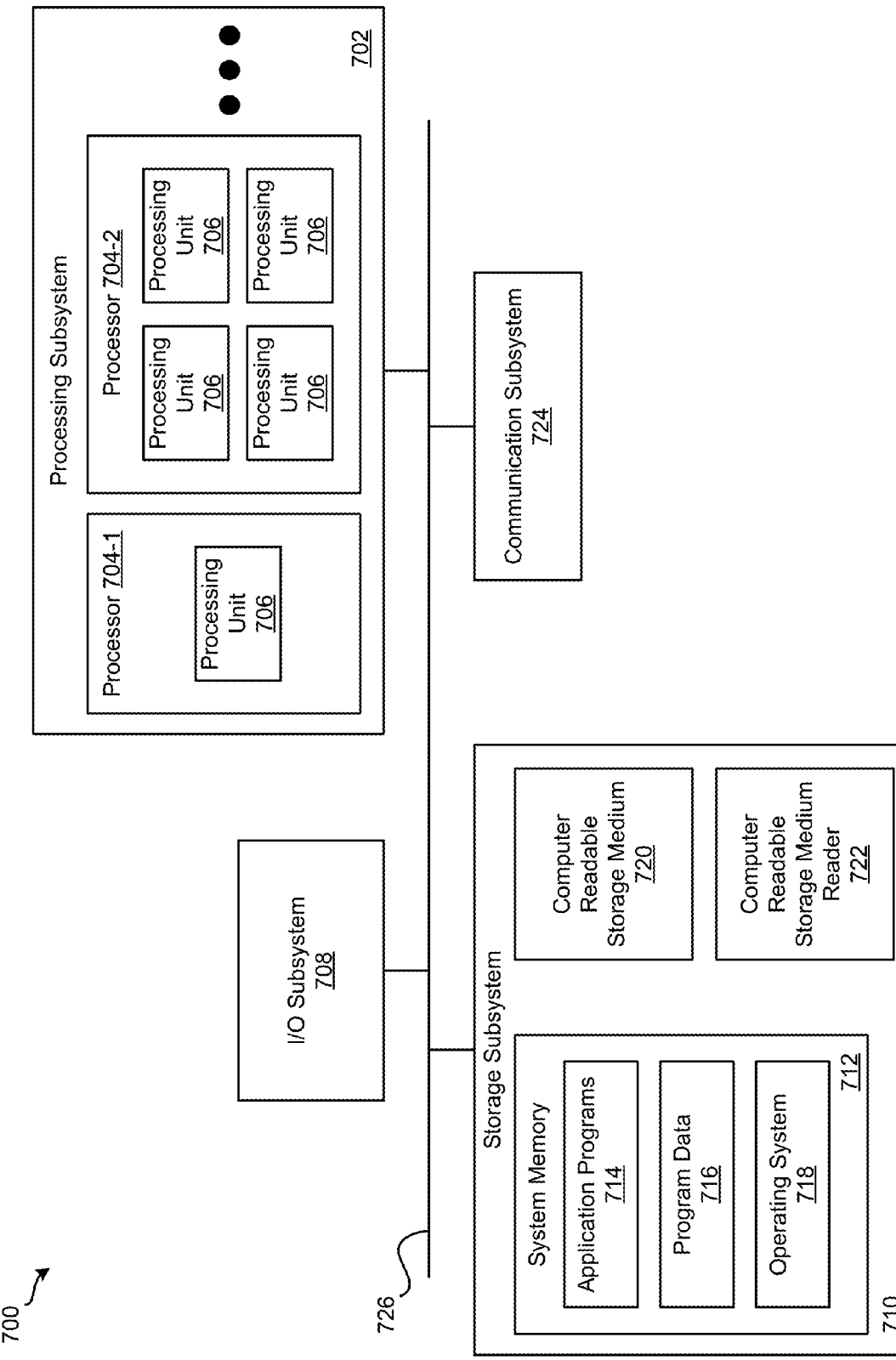
FIG. 7 illustrates an exemplary computer system for implementing various embodiments described above.

FIG. 7 illustrates an exemplary computer system 700 for implementing various embodiments described above. For example, computer system 700 may be used to implement client device 105, computing system 110, and DBMS 120. Computer system 700 may be a desktop computer, a laptop, a server computer, or any other type of computer system or combination thereof. Some or all elements of query manager 125, execution planner 130, execution manager 135, join engine 140, intersection engine 145, and data processing engine(s) 150, or combinations thereof can be included or implemented in computer system 700. In addition, computer system 700 can implement many of the operations, methods, and/or processes described above (e.g., processes 300, 400, 500, and 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to processes 300, 400, 500, and 600.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application 115), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., query manage 125, execution planner 130, execution manager 135, join engine 140, intersection engine 145, and data processing engine(s) 150) and/or processes (e.g., processes 300, 400, 500, and 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
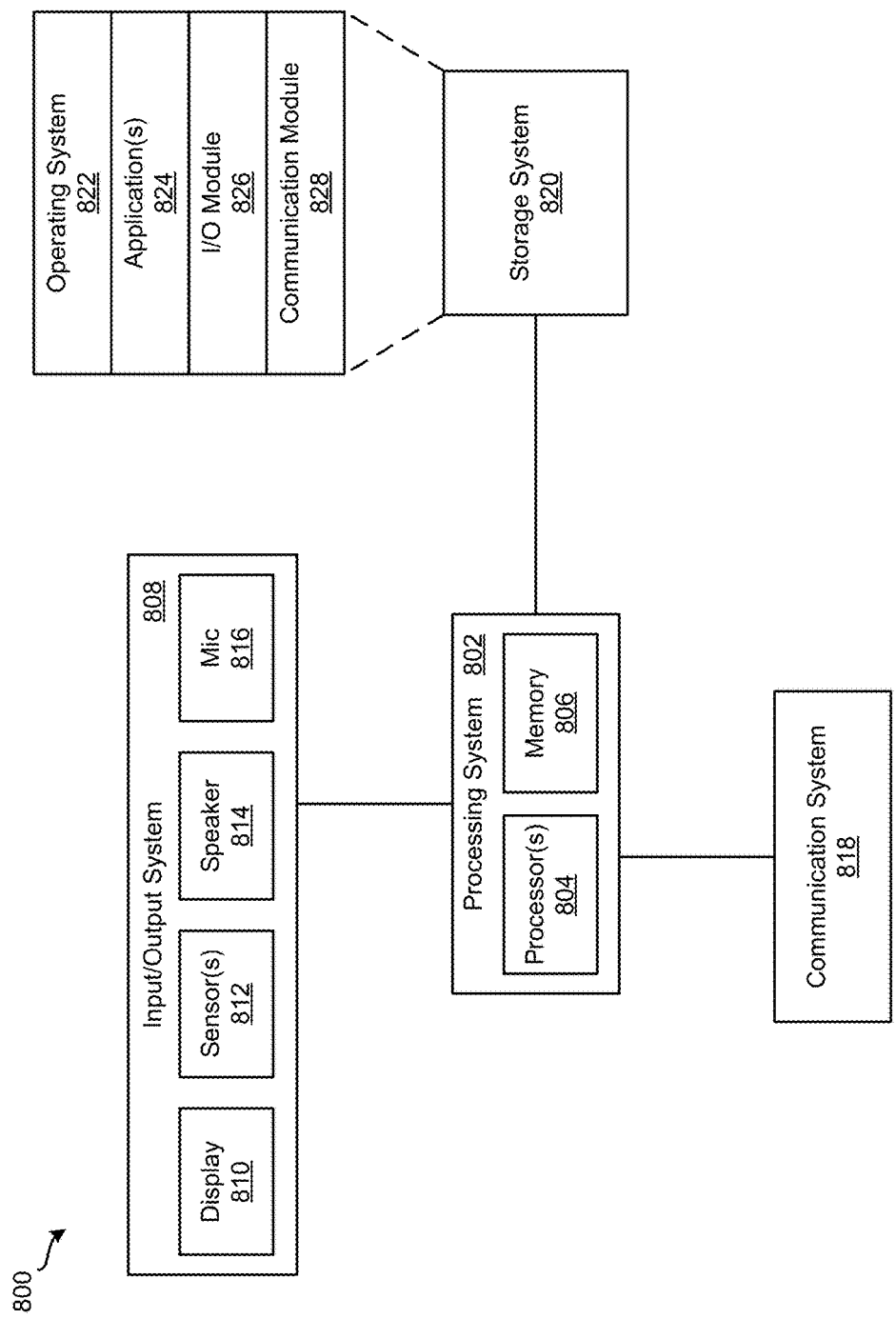
FIG. 8 illustrates an exemplary computing device for implementing various embodiments described above.

FIG. 8 illustrates an exemplary computing device 800 for implementing various embodiments described above. For example, computing device 800 may be used to implement client device 105 and computing system 110. Computing device 800 may be a cellphone, a smartphone, a wearable device, an activity tracker or manager, a tablet, a personal digital assistant (PDA), a media player, or any other type of mobile computing device or combination thereof. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
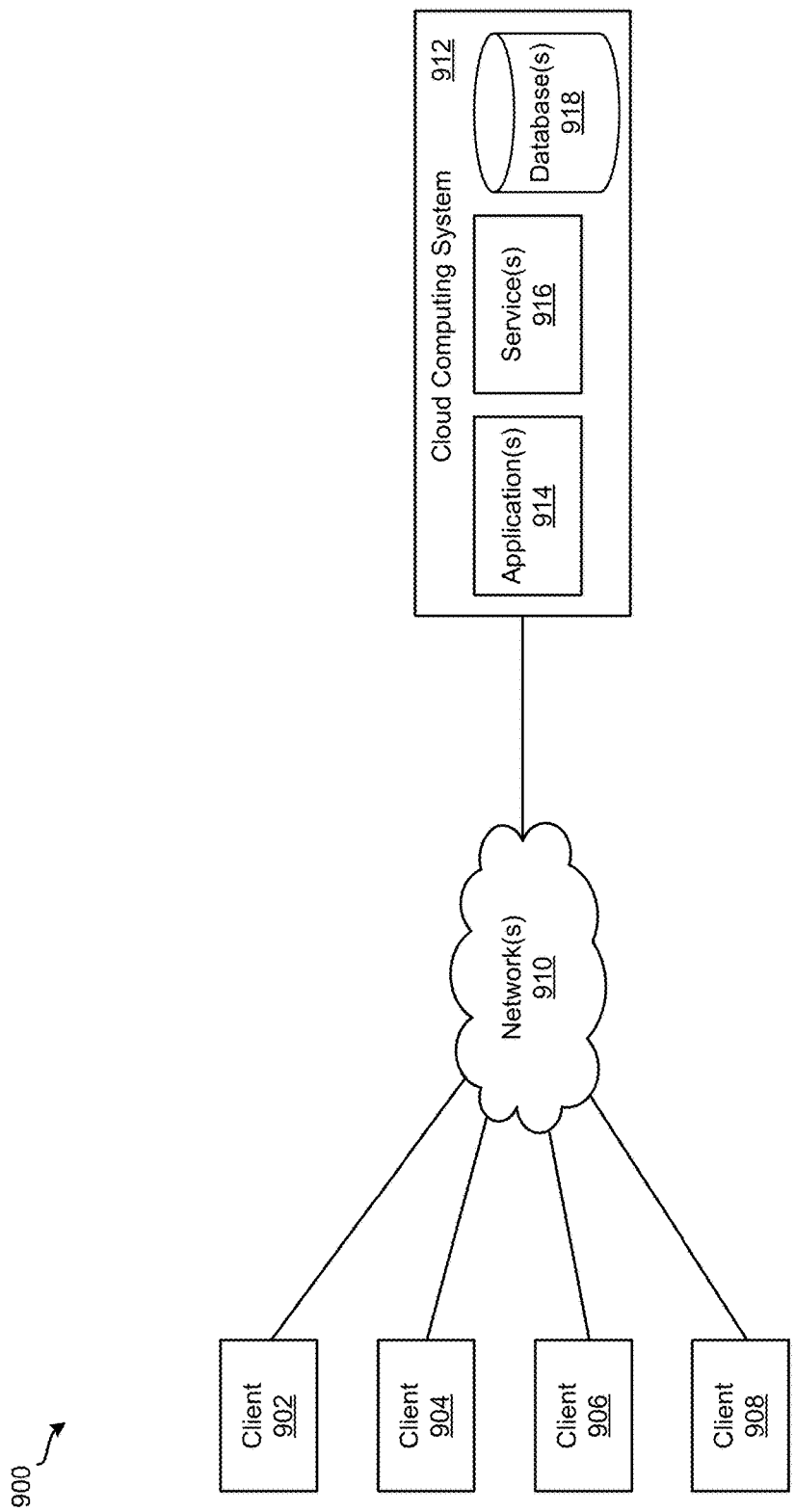
FIG. 9 illustrates an exemplary system for implementing various embodiments described above.

FIG. 9 illustrates an exemplary system 900 for implementing various embodiments described above. For example, cloud computing system 912 of system 900 may be used to implement DBMS 120 and client devices 902-908 may be used to implement client device 105 and computing system 110. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 900 is referred to as a "cloud service." Typically, servers and systems that make up cloud computing system 900 are different from the on-premises servers and systems of a customer. For example, cloud computing system 900 may host an application and a user of one of client devices 902-908 may order and use the application via networks 910.

Applications 914 may include software applications (e.g., application 115) that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, databases 155*a-n* may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof.

In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

receiving a query for data that includes a join operation;

generating a plurality of candidate query execution plans based on the query, each candidate query execution plan comprising a set of reduction operations, wherein the set of reduction operations of a particular candidate query plan in the plurality of candidate query plans comprises a first reduction operation for reducing a first table to a second table based on a first common attribute of the first and second tables used in the join operation and a second reduction operation for reducing the second table to a third table based on a second common attribute of the second and third tables used in the join operation;

determining a plurality of execution costs associated with the plurality of sets of reduction operations of the plurality of candidate query execution plans, wherein determining the execution cost associated with the set of reduction operations of the particular candidate query execution plan comprises determining a first execution cost of the first reduction operation based on a number of distinct values in the first common attribute of the first table and determining a second execution cost of the second reduction operation based on a number of distinct values in the second common attribute of the second table that will remain upon execution of the first reduction operation, wherein determining the first execution cost of the first reduction operation comprises:

determining a total number of rows in the first table, selecting a subset of the total number of rows in the first table, determining a number of distinct values in the first common attribute of the subset of the total number of rows in the first table, determining a number of distinct values in the first table based on the number of distinct values in the first common attribute of the subset of the total number of rows in the first table, using a cost function to calculate the first execution cost of the first reduction operation based on the determined number of distinct values in the first table, determining whether the determined number of distinct values in the first table is larger than the determined the number of distinct values in the first common attribute of the subset of the total number of rows in the first table, using the determined number of distinct values in the first table as a first input to the cost function when the determined number of distinct values in the first table is determined to be larger than the determined the number of distinct values in the first common attribute of the subset of the total number of rows in the first table, and using the determined the number of distinct values in the first common attribute of the subset of the total number of rows in the first table as a second input to the cost function when the determined number of distinct values in the first table is determined to not be larger than the determined the number of distinct values in the first common attribute of the subset of the total number of rows in the first table;

selecting a query execution plan from the plurality of candidate query execution plans based on the plurality of execution costs; and executing the query execution plan to generate a set of query results for the query.

2. The non-transitory machine-readable medium of claim 1, wherein determining the second execution cost of the second reduction operation comprises:

determining a number of rows in the second table that will remain upon execution of the first reduction operation;

determining a number of distinct values in the second common attribute of the second table based on the determined number of rows in the second table that will remain upon execution of the first reduction operation; and using a cost function to calculate the second execution cost of the second reduction operation based on the determined number of distinct values in the second common attribute of the second table based on the determined number of rows in the second table that will remain upon execution of the first reduction operation.

3. The non-transitory machine-readable medium of claim 2, wherein determining the number of rows in the second table that will remain upon execution of the first reduction operation comprises:

determining a total number of rows in the second table;

determining a number of distinct values in the second table; and estimating the number of rows in the second table that will remain upon execution of the first reduction operation based on the total number of rows in the second table and the determined number of distinct values in the second table.

4. The non-transitory machine-readable medium of claim 2, wherein determining the number of rows in the second table that will remain upon execution of the first reduction operation comprises estimating the number of rows in the second table that will remain upon execution of the first reduction operation without performing the first reduction operation.

5. The non-transitory machine-readable medium of claim 1, wherein the program further comprises a set of instructions for sending the set of query results to a requestor from which the query is received.

6. The non-transitory machine-readable medium of claim 1, wherein determining the first execution cost of the first reduction operation further comprises using a predefined constant that describes a cost of interprocess communication between a first host of a first table of the join operation and a second host of a second table of the join operation as another input to the cost function.

7. The non-transitory machine-readable medium of claim 1, wherein the set of reduction operations of the particular candidate query plan in the plurality of candidate query plans further comprises a third reduction operation for reducing the third table to the second table based on the second common attribute of the second and third tables used in the join operation, wherein determining the execution cost associated with the set of reduction operations of the particular candidate query execution plan comprises determining a third execution cost of the third reduction operation based on a number of distinct values in the second common attribute of the third table.

8. A method comprising:
receiving a query for data that includes a join operation;
generating a plurality of candidate query execution plans based on the query, each candidate query execution plan comprising a set of reduction operations, wherein the set of reduction operations of a particular candidate query plan in the plurality of candidate query plans comprises a first reduction operation for reducing a first table to a second table based on a first common attribute of the first and second tables used in the join operation and a second reduction operation for reducing the second table to a third table based on a second common attribute of the second and third tables used in the join operation;
determining a plurality of execution costs associated with the plurality of sets of reduction operations of the plurality of candidate query execution plans, wherein determining the execution cost associated with the set of reduction operations of the particular candidate query execution plan comprises determining a first execution cost of the first reduction operation based on a number of distinct values in the first common attribute of the first table and determining a second execution cost of the second reduction operation based on a number of distinct values in the second common attribute of the second table that will remain upon execution of the first reduction operation, wherein determining the first execution cost of the first reduction operation comprises:
determining a total number of rows in the first table, selecting a subset of the total number of rows in the first table,
determining a number of distinct values in the first common attribute of the subset of the total number of rows in the first table,
determining a number of distinct values in the first table based on the number of distinct values in the first common attribute of the subset of the total number of rows in the first table,
using a cost function to calculate the first execution cost of the first reduction operation based on the determined number of distinct values in the first table;
determining whether the determined number of distinct values in the first table is larger than the determined the number of distinct values in the first common attribute of the subset of the total number of rows in the first table,
using the determined number of distinct values in the first table as a first input to the cost function when the determined number of distinct values in the first table is determined to be larger than the determined the number of distinct values in the first common attribute of the subset of the total number of rows in the first table, and
using the determined the number of distinct values in the first common attribute of the subset of the total number of rows in the first table as a second input to the cost function when the determined number of distinct values in the first table is determined to not be larger than the determined the number of distinct values in the first common attribute of the subset of the total number of rows in the first table;
selecting a query execution plan from the plurality of candidate query execution plans based on the plurality of execution costs; and
executing the query execution plan to generate a set of query results for the query.

9. The method of claim 8, wherein determining the second execution cost of the second reduction operation:
determining a number of rows in the second table that will remain upon execution of the first reduction operation;
determining a number of distinct values in the second common attribute of the second table based on the determined number of rows in the second table that will remain upon execution of the first reduction operation; and
using a cost function to calculate the second execution cost of the second reduction operation based on the determined number of distinct values in the second common attribute of the second table based on the determined number of rows in the second table that will remain upon execution of the first reduction operation.

10. The method of claim 9, wherein determining the number of rows in the second table that will remain upon execution of the first reduction operation comprises:
determining a total number of rows in the second table;
determining a number of distinct values in the second table; and
estimating the number of rows in the second table that will remain upon execution of the first reduction operation based on the total number of rows in the second table and the determined number of distinct values in the second table.

11. The method of claim 9, wherein determining the number of rows in the second table that will remain upon execution of the first reduction operation comprises estimating the number of rows in the second table that will remain upon execution of the first reduction operation without performing the first reduction operation.

12. The method of claim 8 further comprising sending the set of query results to a requestor from which the query is received.

13. The method of claim 8, wherein determining the first execution cost of the first reduction operation further comprises using a predefined constant that describes a cost of interprocess communication between a first host of a first table of the join operation and a second host of a second table of the join operation as another input to the cost function.

14. The method of claim 8, wherein the set of reduction operations of the particular candidate query plan in the plurality of candidate query plans further comprises a third reduction operation for reducing the third table to the second table based on the second common attribute of the second and third tables used in the join operation, wherein determining the execution cost associated with the set of reduction operations of the particular candidate query execution plan comprises determining a third execution cost of the third reduction operation based on a number of distinct values in the second common attribute of the third table.

15. A system comprising:
a set of processing units; and
a non-transitory computer-readable medium storing instructions that when executed by at least one processing unit in the set of processing units cause the at least one processing unit to:
receive a query for data that includes a join operation;
generate a plurality of candidate query execution plans based on the query, each candidate query execution plan comprising a set of reduction operations, wherein the set of reduction operations of a particular candidate query plan in the plurality of candidate query plans comprises a first reduction operation for reducing a first table to a second table based on a first common attribute of the first and second tables used in the join operation and a second reduction operation for reducing the second table to a third table based on a second common attribute of the second and third tables used in the join operation;
determine a plurality of execution costs associated with the plurality of sets of reduction operations of the plurality of candidate query execution plans, wherein determining the execution cost associated with the set of reduction operations of the particular candidate query execution plan comprises determining a first execution cost of the first reduction operation based on a number of distinct values in the first common attribute of the first table and determining a second execution cost of the second reduction operation based on a number of distinct values in the second common attribute of the second table that will remain upon execution of the first reduction operation, wherein determining the first execution cost of the first reduction operation comprises:
determining a total number of rows in the first table,
selecting a subset of the total number of rows in the first table,
determining a number of distinct values in the first common attribute of the subset of the total number of rows in the first table,
determining a number of distinct values in the first table based on the number of distinct values in the first common attribute of the subset of the total number of rows in the first table,
using a cost function to calculate the first execution cost of the first reduction operation based on the determined number of distinct values in the first table;
determining whether the determined number of distinct values in the first table is larger than the determined the number of distinct values in the first common attribute of the subset of the total number of rows in the first table,
using the determined number of distinct values in the first table as a first input to the cost function when the determined number of distinct values in the first table is determined to be larger than the determined the number of distinct values in the first common attribute of the subset of the total number of rows in the first table, and
using the determined the number of distinct values in the first common attribute of the subset of the total number of rows in the first table as a second input to the cost function when the determined number of distinct values in the first table is determined to not be larger than the determined the number of distinct values in the first common attribute of the subset of the total number of rows in the first table;
select a query execution plan from the plurality of candidate query execution plans based on the plurality of execution costs; and
execute the query execution plan to generate a set of query results for the query.

16. The system of claim 15, wherein determining the second execution cost of the second reduction operation:
determining a number of rows in the second table that will remain upon execution of the first reduction operation;
determining a number of distinct values in the second common attribute of the second table based on the determined number of rows in the second table that will remain upon execution of the first reduction operation; and
using a cost function to calculate the second execution cost of the second reduction operation based on the determined number of distinct values in the second common attribute of the second table based on the determined number of rows in the second table that will remain upon execution of the first reduction operation.

17. The system of claim 16, wherein determining the number of rows in the second table that will remain upon execution of the first reduction operation comprises:
determining a total number of rows in the second table;
determining a number of distinct values in the second table; and
estimating the number of rows in the second table that will remain upon execution of the first reduction operation based on the total number of rows in the second table and the determined number of distinct values in the second table.

18. The system of claim 16, wherein determining the number of rows in the second table that will remain upon execution of the first reduction operation comprises estimating the number of rows in the second table that will remain upon execution of the first reduction operation without performing the first reduction operation.

19. The system of claim 15, wherein determining the first execution cost of the first reduction operation further comprises using a predefined constant that describes a cost of interprocess communication between a first host of a first table of the join operation and a second host of a second table of the join operation as another input to the cost function.

20. The system of claim 15, wherein the set of reduction operations of the particular candidate query plan in the plurality of candidate query plans further comprises a third reduction operation for reducing the third table to the second table based on the second common attribute of the second and third tables used in the join operation, wherein determining the execution cost associated with the set of reduction operations of the particular candidate query execution plan comprises determining a third execution cost of the third reduction operation based on a number of distinct values in the second common attribute of the third table.

* * * * *